Figure 1:
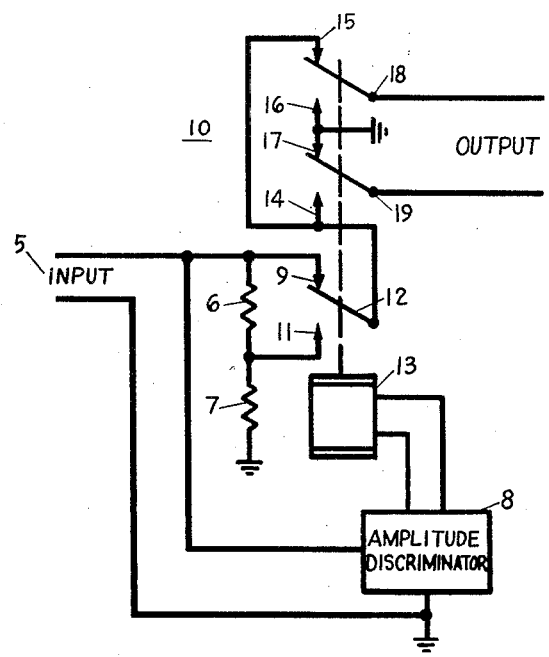

Feb. 18, 1958     C. S. JOSIAS ET AL     2,824,297
AUTOMATIC SCALE-CHANGING APPARATUS
Filed March 27, 1956     3 Sheets-Sheet 1

INVENTORS.
CONRAD S. JOSIAS
EUGENE K. PLOFKER
BY George Lipkin
Lee L. Huntzberger
ATTORNEYS

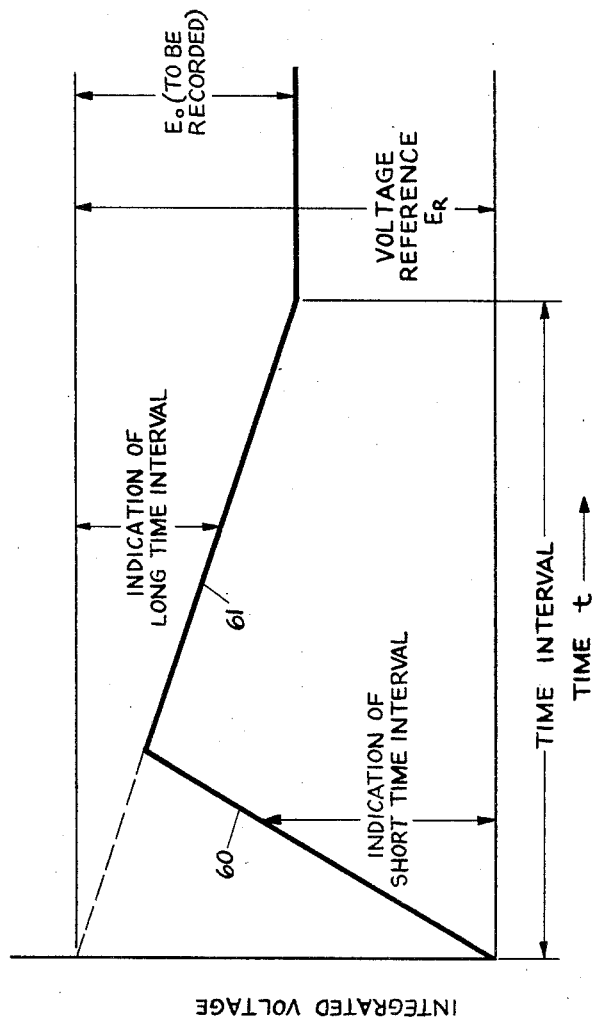

United States Patent Office 2,824,297
Patented Feb. 18, 1958

2,824,297

AUTOMATIC SCALE-CHANGING APPARATUS

Conrad S. Josias, Mineola, and Eugene K. Plofker, Yonkers, N. Y., assignors, by mesne assignments, to the United States of America as represented by the Secretary of the Navy Application March 27, 1956, Serial No. 574,346

19 Claims. (Cl. 340—253)

This invention relates to automatic scale-changing apparatus for use with measuring instruments and, more particularly, to apparatus for automatically switching to a less sensitive scale of measurement whenever the magnitude of a particular parameter of an applied input signal exceeds a certain discrete value.

In making measurements of the magnitude of a particular parameter of a signal, which magnitude varies over a wide dynamic range, increased resolution may be achieved by utilizing a more sensitive scale of measurement for relatively small magnitudes. Thus, for instance, if a particular parameter of a signal varies over a dynamic range from zero to ten, greater resolution will be obtained by utilizing a scale of zero to one whenever the magnitude of the particular parameter has a value less than one and utilizing a scale of zero to ten whenever the magnitude of the particular parameter has a value greater than one.

This invention contemplates apparatus which accomplishes scale changing in a completely automatic manner. Such apparatus is particularly useful when incorporated in unattended recording equipment. However, even in attended recording or indicating equipment, this invention may be used to relieve the operator of the necessity of changing or switching scales as the magnitude of the particular parameter being measured varies in magnitude.

It is therefore an object of this invention to provide automatic scale-changing apparatus for measuring instruments:

It is a further object of this invention to provide automatic scale-changing apparatus which as the magnitude of a particular parameter of the input signal varies over a first portion of its dynamic range, the output signal varies over its complete dynamic range, and as the magnitude of the particular parameter of the input signal varies over a second portion of its dynamic range, the output signal again varies over substantially its complete dynamic range;

It is a still further object of this invention to provide automatic scale-changing apparatus which is responsive to either the level or amplitude of a signal, the duration of a signal, or in general, any physical property that may be represented analogously as either an amplitude or as a time interval.

Figure 2:
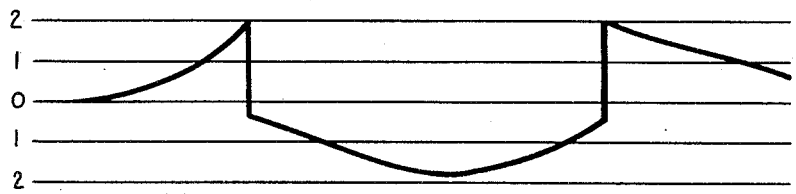
Figure 3:
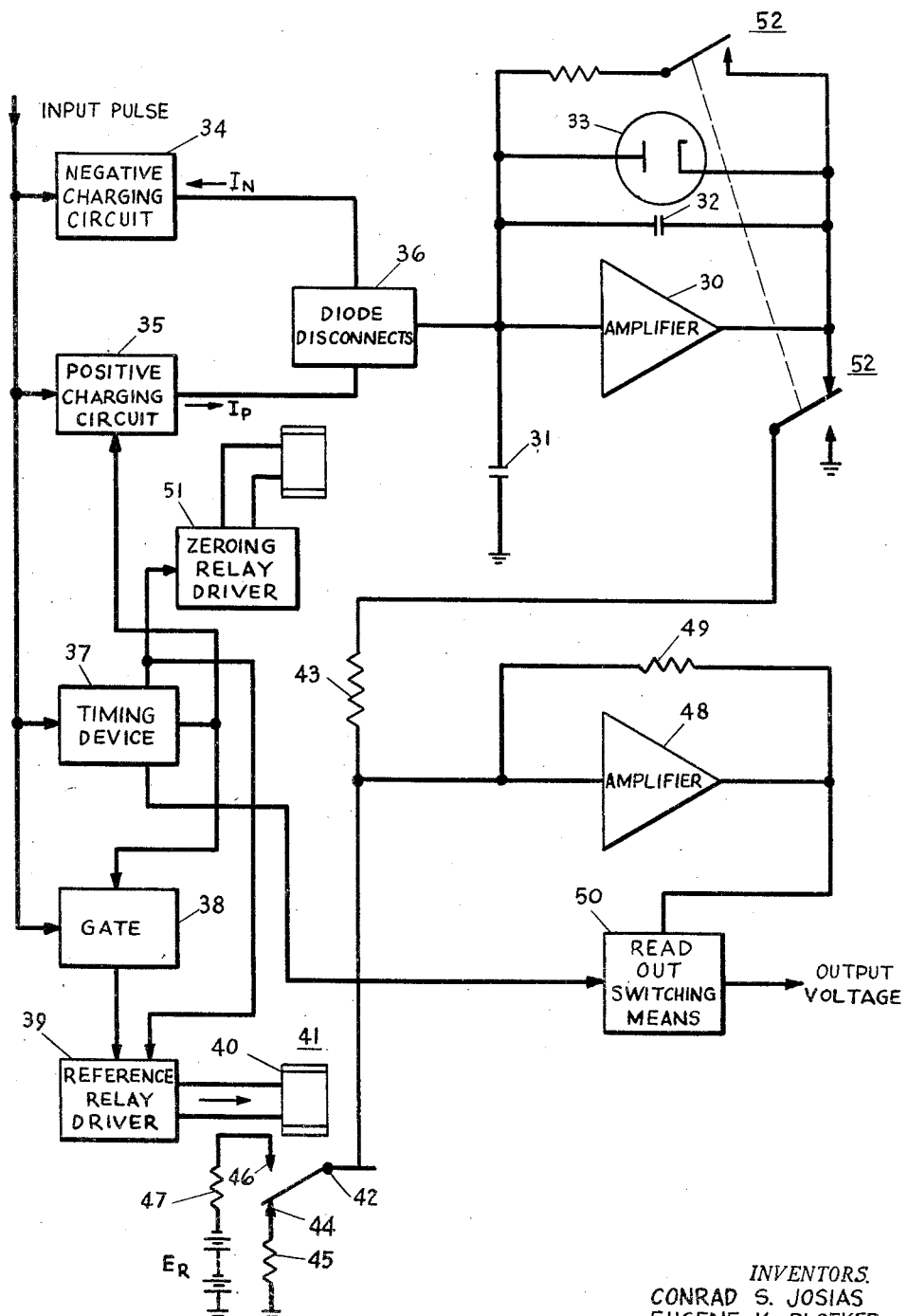

Other objects and many of the attendant advantages of this invention will be readily appreciated as the same becomes better understood by reference to the following detailed description when considered in connection with the accompanying drawings wherein:

Fig. 1 is a schematic circuit diagram of an automatic scale-changing apparatus responsive to the level or amplitude of an applied input signal, Fig. 2 is a diagram of a typical recording obtained with measuring equipment incorporating the circuit shown in Fig. 1, Fig. 3 is a block and schematic diagram of an automatic scale-changing apparatus responsive to the duration of each individual pulse of an applied pulse signal, and Fig. 4 is a graph illustrating the output obtained from the circuit shown in Fig. 3.

Referring now to Fig. 1, an input signal 5 having a signal level which varies in magnitude over a given dynamic range is applied across a voltage divider consisting of resistances 6 and 7 connected in series, as shown. Input signal 5 is also applied as the input to amplitude discriminator 8.

Amplitude discriminator 8 is any conventional circuit which provides no output until the level of the input applied thereto exceeds a certain discrete value, and then provides a given fixed output whenever the level of the input applied thereto exceeds this certain discrete value. Such circuits have been described in "A thermionic trigger," by O. H. Schmitt, Jour. Sci. Insts., 1938, vol. XV, p. 24; "Time Bases," O. S. Puckle, John Wiley & Sons, New York, 1943, pp. 57–59; and "Electronics, Experimental Techniques," W. C. Elmore and Matthew Sands, McGraw-Hill Book Co., New York, 1945, pp. 99–103.

The input signal across the entire voltage divider formed by resistances 6 and 7 is applied to fixed contact 9 of relay 10. The portion of the input signal appearing across resistance 7 of the voltage divider is applied to fixed contact 11 of relay 10. Movable contact 12 of relay 10 is normally in contact with fixed contact 9, and is moved into contact with fixed contact 11 only in response to operating coil 13 of relay 10 being energized.

Operating coil 13 of relay 10 is energized by the output of amplitude discriminator 8, which is applied thereto, as shown.

Movable contact 12 is connected to fixed contacts 14 and 15 of relay 10. Fixed contacts 16 and 17 of relay 10 are connected to a point of reference potential. The output of the circuit is obtained at movable contacts 18 and 19 of relay 10. Movable contacts 18 and 19 are ganged with movable contact 12, as shown. Contacts 14, 15, 16, 17, 18 and 19 of relay 10 serve as a reversing switch for reversing the polarity of the output.

The output of the circuit shown in Fig. 1 is applied as the input to a conventional recorder (not shown) through an appropriate differential driver amplifier.

Considering now the operation of the circuit shown in Fig. 1, so long as the magnitude of the input is below a certain discrete value, there is no output from amplitude discriminator 8. Therefore, input signal 5 is connected directly to the output through fixed contact 9, movable contact 12, fixed contact 15 and movable contact 18, all of relay 10, and the other side of the output appearing at movable contact 19 of relay 10 is connected to the point of reference potential. However, whenever the magnitude of input signal 5 exceeds this certain discrete value, operating coil 13 of relay 10 is energized. Therefore, the portion of input signal 5 appearing across resistance 7 of the voltage divider is applied to the output through fixed contact 11, movable contact 12, fixed contact 14 and movable contact 19, all of relay 10. The other side of the output appearing at movable contact 18 of relay 10 is connected to the point of reference potential in this case. The portion of input signal 5 appearing across resistance 7 of the voltage divider is equal to the magnitude of resistance 7 divided by the sum of the magnitudes of resistances 6 and 7 all multiplied by the magnitude of the entire input signal 5.

Fig. 2 shows a typical recording made on a recorder having the output of the circuit of Fig. 1 applied as an input thereto. As the magnitude of input signal 5 initially increases, the indication on the recording increases from level 0 through level 1 to full scale level 2. Full scale level 2 is the certain discrete value of magnitude, discussed above, which triggers amplitude discriminator 8, thereby switching the movable contacts of relay 10. This causes only the portion of the input appearing across resistance 7 to be applied to the recorder, and this portion is applied with reversed polarity. Therefore, the indication on the recording drops to a value equal to a fraction of level −1. As input signal 5 continues to increase in magnitude, the indication on the recording approaches level −2. Then, as the magnitude of input signal 5 begins to decrease, the indication on the recording moves back to a fraction of level −1, at which point relay 10 is deenergized, and the entire input signal is again applied to the recorder. Therefore, the indication on the recording moves back to level 2, and as the magnitude of the signal continues to decrease, again approaches level 0.

In the preferred embodiment of this invention shown in Fig. 1, the reversal in the polarity of the output by the reversing switch formed by contacts 14 through 19 of relay 10 serve to remove any ambiguity as to which scale is being employed at any given time. However, alternative structure may be employed to remove this ambiguity. For instance, an auxiliary contact on relay 10 could be used to light a pilot lamp, or to actuate the scale of an indicating instrument to move an approximately marked scale into position behind the pointer, etc.

It will be seen that the scale-changing provided by the circuit shown in Fig. 1, results in low magnitude input signals benig indicated on the recording with much greater resolution, and that this scale-changing is completely automatic, being dependent only upon the actual magnitude of the input signal. Therefore, the circuit shown in Fig. 1 will operate perfectly satisfactorily when incorporated in unattended recording equipment.

Referring now to Fig. 3, there is shown a circuit which is responsive to the duration of individual pulses of a pulse input signal, rather than the level or amplitude of of the input signal.

Fig. 3 consists of an integrating amplifier composed of amplifier 30, input capacitance 31, feedback capacitance 32 and diode 33, connected as shown, shunting capacitance 32. The integrating amplifier is charged by the currents from negative charging circuit 34 and positive charging circuit 35 which are applied to amplifier 30 through diode disconnect 36. Negative and positive charging circuits 34 and 35, respectively are gated constant current sources which are rendered operative only during the presence of a pulse applied as an input thereto.

Capacitance 31 is of particular use in storing charge for pulses of short duration. Since the integrating amplifier has certain speed of response limitations, it is important that the initial charge supplied by the charging circuits be stored and not dissipated. The input capacitance 31 performs the function of a charge storer and also acts to maintain a virtual ground at the input to the integrator at the beginning of the charging period.

Positive charging circuit 35 provides a constant current of a given magnitude in a certain direction, while negative charging circuit 34 provides a constant current of a magnitude smaller than the given magnitude of the current provided by positive charging circuit 35, and in the opposite direction with respect thereto.

The input pulse signal is also applied as the input to timing device 37 which provides three respective outputs each of which occurs at a different given time after the commencement of an applied pulse. Timing device 37 may consist of a number of cascaded monostable multivibrators, or any other well known circuit arrangement for producing an output a fixed time after the application of an input.

The first occurring output of timing device 37 is applied to positive charging circuit 35 for effecting the cutoff of the output from positive charging circuit 35. This first occurring output is also applied as an input to coincidence gate 38 along with the input pulse. Coincidence gate 38 produces an output only in response to both the input pulse and the first occurring output of timing device 37 being applied thereto.

The output of gate 38 is applied as an input to reference relay driver 39, which may include a bistable multivibrator, for producing an output which energizes operating coil 40 of relay 41.

The output of amplifier 30 is applied to movable contact 42 of relay 41 through resistance 43. Fixed contact 44 of relay 41 is connected to a point of reference potential through resistance 45. Fixed contact 46 of relay 41 is connected to the point of reference potential through resistance 47 in series with a fixed reference voltage $E_R$. Movable contact 42 is normally in contact with fixed contact 44.

The potential appearing at movable contact 42 of relay 41 is applied as an input to a D. C. feedback amplifier consisting of amplifier 48 and feedback resistance 49. The output of amplifier 48 may be connected to a measuring instrument, such as a recorder (not shown), through read out switching means 50. Read out switching means 50 is normally open, and is only closed in response to a second output from timing device 37 being applied thereto. This second output from timing device 37 occurs at a time interval after the initiation of an input pulse which is longer than the longest duration input pulse.

A third output from timing device 37 is applied to a zeroing relay driver 51 and to relay driver 39 at a fixed time after the occurrence of the second output from timing device 37. The output from zeroing relay driver 51 is effective in closing relay 52, which is connected as shown to zero the integrating amplifier and the D. C. feedback amplifier, and in deenergizing operating coil 40 of relay 41.

Considering now the operation of this circuit shown in Fig. 3, in response to the initiation of an input pulse, integrating amplifier 30 is simultaneously charged by a relatively large positive constant current from positive charging circuit 35 and discharged by a relatively small constant current from negative charging circuit 34. Therefore, amplifier 30 produces a linearly rising positive voltage which is proportional to the difference between the magnitudes of the positive and negative constant currents. Line 60 in Fig. 4, with its relatively large positive slope, represents this voltage.

Since movable contact 42 of relay 41 is initially connected to fixed contact 44, this linearly rising voltage, alone, is applied as the input to amplifier 48, which produces an output therefrom which is proportional thereto.

Should the duration of the input pulse exceed the certain discrete value at which the initial output from timing device 37 is produced, positive charging circuit 35 will be rendered inoperative subsequent to this certain discrete value of duration, and at the same time movable contact 42 of relay 41 will be switched to fixed contact 46. Therefore, the voltage across capacitor 32 will begin to linearly decrease at a rate which is proportional to the constant current from negative charging circuit 34. Furthermore, the output voltage of amplifier 30 will be placed in series with the fixed reference voltage $E_R$ due to the switching of relay 41. In this case, the algebraic sum of these two voltages will be applied as the input to amplifier 48, which produces an output proportional thereto.

Line 61 in Fig. 4, with its relatively small negative slope, represents the integrated voltage output of amplifier 30 subsequent to positive charging circuit 35 being rendered inoperative. Fixed reference voltage $E_R$ has, as shown in Fig. 4, an absolute magnitude equal to the extrapolation of line 61 at time zero, i. e., at the initiation of the input pulse. The actual polarity of fixed reference voltage $E_R$ is negative, so that the input to amplifier 48 is equal to the fixed reference voltage $E_R$ minus the instantaneous value of the integrated voltage from amplifier 30, shown in line 61 of Fig. 4. Therefore, the polarity of the output from amplifier 48 will be positive for those pulses having a duration less than the certain discrete value at which positive charging circuit 35 is rendered inoperative and will be negative for those pulses having a duration longer than this certain discrete value.

The purpose of diode 33 is to short circuit any spurious negative polarity output from amplifier 30.

From the foregoing, it will be seen that there will be a single-valued correspondence between the output obtained from amplifier 48 and the duration of an input pulse; that the absolute value of this output will never exceed the magnitude of fixed reference voltage $E_R$; and that the scale with which this output represents the duration of a pulse is more sensitive for pulses having a duration less than the aforementioned certain discrete value than for pulses having a duration longer than this value. The output from amplifier 48 is adapted to be applied to a measuring instrument, such as a recorder, in response to the second output from timing device 37, which effects the closing of read out switching means 50.

The third output from timing device 37 zeroes the circuit, in readiness for the next pulse, in response to the third output from timing device 37.

Obviously many modifications and variations of the present invention are possible in the light of the above teachings. It is therefore to be understood that within the scope of the appended claims the invention may be practiced otherwise than as specifically described.

We claim:

1. Automatic scale-changing apparatus comprising first means responsive to a particular parameter of a signal applied as an input thereto for producing an output having a magnitude which is a function of the magnitude of said particular parameter, and second means coupled to said first means and responsive to the magnitude of said particular parameter for changing the function between the magnitudes of the output of said first means and said particular parameter from a first given function to a second given function whenever the magnitude of said particular parameter exceeds a certain discrete value, said particular parameter being the amplitude of said signal applied as an input to said first means, said first means including third means responsive to the amplitude of said input signal for producing a first output having a selected direction of signal travel and an amplitude which is a first proportion of the amplitude of said input signal and a second output having an opposite direction of signal travel and an amplitude which is a second proportion of the amplitude of said input signal, said second proportion being smaller than said first proportion, and switch means between said first means and said second means for reversing the direction of output signal travel in said second means, said switch means being coupled to said third means for selectively applying said first and second outputs of said third means as the output of said first means, and wherein said second means includes fourth means coupled to said switch means, said fourth means including a amplitude discriminating means having said input signal applied as an input thereto for switching said switch means from its first normal position to its second position whenever the amplitude of said input signal exceeds said certain discrete value of magnitude.

2. The automatic scale-changing apparatus defined in claim 1, wherein said third means comprises a resistance voltage divider having said input signal applied thereacross, said entire input signal being applied to said switch means as the first output of said third means and a portion of said input signal appearing across a portion of said voltage divider being applied to said switch means as the second output of said third means.

3. The automatic scale-changing apparatus defined in claim 2, wherein said switch means includes fourth means for reversing the relative polarity of the output of said first means in response to operation of said switch means.

4. The automatic scale-changing apparatus defined in claim 1, wherein said fourth means selectively provides as an output therefrom one of first and second constant currents in response to a pulse from said pulse signal being applied as an input thereto, and fifth means for applying the output of said fourth means as the input to said third means, and wherein said second means comprising timing means coupled to said fourth means and responsive to a pulse of said pulse signal being applied as an input thereto for selecting said first constant current as the output of said fourth means for that portion of a pulse which is less than a certain discrete duration and selecting said second constant current for that portion of a pulse which exceeds said certain discrete duration.

5. The automatic scale-changing apparatus defined in claim 4, wherein said first means further includes sixth means for selectively placing a fixed voltage of opposite polarity from the output voltage of said third means in series with the output voltage of said third means, and wherein said timing means are coupled to said sixth means for placing said fixed voltage in series with the output of said third means only during that portion of a pulse which exceeds said certain discrete duration.

6. The automatic scale-changing apparatus defined in claim 5, wherein the absolute magnitude of said fixed voltage is equal to the output voltage of said third means which would be obtained from integrating said second constant current for said certain discrete duration.

7. The automatic scale-changing apparatus defined in claim 6, wherein said third means comprises an integrating amplifier, and wherein said fourth means comprises a positive charging circuit and a negative charging circuit, the absolute magnitude of the difference in current supplied by said positive and negative charging circuits being greater than the absolute magnitude of the current supplied by said negative charging circuit, and wherein said timing means is effective in rendering said positive charging circuit inoperative after said certain discrete duration, whereby said first constant current is equal to the difference between the currents supplied by said positive and negative charging circuits and said second constant current is equal to the current supplied by said negative charging circuit.

8. The automatic scale-changing apparatus defined in claim 7, further comprising normally open read out switching means inserted between the output of said third means and the output of said first means, said switching means being coupled to said timing means for closing said switching means for a given interval a second certain discrete duration after the initiation of a pulse of said pulse signal, said second certain discrete duration being at least as long as the longest duration pulse contained in said pulse signal.

9. The automatic scale-changing apparatus defined in claim 8, further including zeroing means coupled to said integrating amplifier and to said timing means for discharging said integrating amplifier a third certain discrete duration after the initiation of a pulse of said pulse signal, said third certain discrete duration being longer than said second certain discrete duration.

10. An automatic device for indicating the value of an electric signal on one scale of values when a parameter of the signal is within one value range, and on another and different scale of values when said parameter of the signal is within another value range, which comprises an input circuit to which the input signal may be applied, an output circuit for connection to an indicating device of the type having an indicator and a sensitive scale and one less sensitive, with the polarity of the input signal determining the scale on which a parameter of the input signal is measured, means responsive to a parameter of the input signal for passing through said output circuit in one direction any signals received in said input circuit whose said parameters are within a value that can be indicated by said less sensitive scale, and for passing through said output circuit in the opposite direction all other signals whose value of said parameter is to be measured on said more sensitive scale.

11. An automatic device for indicating the value of an electric signal on one scale of values when a parameter of the signal is within one value range, and on another and different scale of values when said parameter of the signal is within another value range, which comprises an input circuit to which the input signal may be applied, an output circuit for connection to an indicating device of the type having an indicator and a sensitive scale and one less sensitive, with the polarity of the input signal determining the scale on which a parameter of the input signal is measured, means for passing an input signal to said output circuit, and means responsive to a parameter of the input signal for reversing the polarity of the signal delivered to said output circuit when the value of said parameter of the signal is outside of a selected range of values.

12. An automatic device for indicating the value of an electric signal on one scale of values when a parameter of the signal is within one value range, and on another and different scale of values when said parameter of the signal is within another value range, which comprises means responsive to a selected parameter of a signal applied as an input thereto for producing an output signal having a selected characteristic and a magnitude, said parameter in a range which is proportional to the magnitude of said selected parameter, and means controlled by said input signal and operable to change the characteristic of said output signal, when said parameter is outside of said range, whereby said change in characteristics in the output signal may be employed to indicate which range of parameters applies in interpreting said output signals.

13. The device as set forth in claim 12, wherein said selected parameter is the amplitude of the input signal and said signal characteristic is the direction of current flow of the output signal.

14. The device as set forth in claim 13, wherein said means controlled by said input signal includes an amplitude discriminator connected to receive the input signal and relay means controlled by said discriminator for reversing the direction of travel of said output signal whenever the amplitude of said input signal is outside of a selected range.

15. An automatic device for indicating the value of an electric signal on an indicator having one scale when the signal is within one value range and another and less sensitive scale when the signal is within another and different value range, where the change in scales is made by reversal of the direction of current flow through the indicator, which comprises means for receiving an input pulse signal, an integrating amplifier, a negative charging circuit and a positive charging circuit connected to said means and to said amplifier, a diode disconnector in said connection between said charging circuits and said amplifier, for passing an electric current from said negative charging current to said amplifier and an electric current from said amplifier to said positive charging circuit, a summing amplifier connected to said integrating amplifier to receive current from said integrating amplifier, and to an output circuit for connection to said indicating device of a type which changes scales of values upon reversal of current therethrough, a relay operable to connect said summing amplifier to said output circuit, a timing device connected to said input receiving means and activated upon application of an input pulse to said receiving means, means controlled by said timing device for reversing the direction of travel of the current in said summing amplifier whenever the duration of said input pulse is outside of a selected range, said timing device also controlling said relay between said summing amplifier and said output circuit to connect the summing amplifier to said output circuit a selected time after said input pulse is applied to said timer, and means also controlled by said timing device and operable after a further operation of said timer to discharge said integrating amplifier and to inactivate said current reversing means.

16. An automatic device for indicating the value of an electric signal on an indicator having one scale when the signal is within one value range and another and less sensitive scale when the signal is within another and different value range, where the change in scales is made by reversal of the direction of current flow through the indicator, which comprises means for receiving an input pulse signal, an integrating amplifier, means for establishing in said integrating amplifier a voltage whose amount is proportional to the duration of the input pulse, an output voltage circuit for connection to a voltmeter having two scales, one of which is less sensitive than the other, and connected to said integrating amplifier, the scale of the voltmeter in use at any time depending upon the polarity of the voltage delivered thereto, a relay operable when activated to connect said amplifier to said output circuit, means for modifying the voltage delivered by said amplifier to said output circuit through said relay, if the input pulse duration has exceeded the capacity of the most sensitive scale of said voltmeter, by adding to such voltage a negative voltage increment sufficient to reverse the polarity of the voltage delivered by said amplifier to said output circuit, means for discharging said amplifier, timer means activated by each pulse delivered to said receiving means, and operable sequentially first to activate said modifying means if the pulse is still being delivered to said receiving means, next to activate said relay controlling the connection between the amplifier and said output circuit to connect said amplifier to said output circuit, and then to inactivate said voltage modifying means and activate said amplifier discharging means, to discharge the voltage set up in said integrating amplifier.

17. The device as set forth in claim 16, and a summing amplifier included in series in said connection from said integrating amplifier and said modifying means to said output voltage circuit.

18. An automatic measuring device for an input signal in which a voltmeter is employed and has measuring scales which are activated alternately and automatically by reversal of polarity of the voltage impressed on the voltmeter, depending on whether the input signal has a duration within one range or another, which comprises an input pulse circuit, an integrating amplifier, means for setting up in said amplifier a voltage proportional to the duration of an input pulse applied to said circuit, an output voltage circuit for connection to said voltmeter having a sensitive scale and a less sensitive scale in which the polarity of the impressed voltage regulates which scale is used, a circuit connecting said means to said output voltage circuit and having therein a relay which, when activated, completes that connection, a timing element activated by an input pulse in said first mentioned circuit, means controlled jointly by said input pulse and said timing element when the latter is activated for adding to said set up voltage in said amplifier a negative voltage increment sufficient to reverse the polarity of said set up voltage delivered to said output voltage circuit if the input pulse duration has exceeded the capacity of the most sensitive scale of said voltmeter, and means controlled by said timer after operation of said jointly controlled means for first activating said relay to deliver said set up voltage to said output voltage circuit, and then inactivating said voltage modifying means and discharging said set up voltage.

19. The automatic scale-changing apparatus defined in claim 11, wherein said signal applied as an input to said input circuit is a pulse signal, and wherein said particular parameter is the duration of the pulses of said pulse signal.

References Cited in the file of this patent

UNITED STATES PATENTS

| | | |
|---|---|---|
| 2,533,091 | Campani | Dec. 5, 1950 |
| 2,536,465 | Reeves | Jan. 2, 1951 |
| 2,643,344 | McLaren et al. | June 23, 1953 |